(12) United States Patent
Wässingbo

(10) Patent No.: US 11,070,864 B2
(45) Date of Patent: Jul. 20, 2021

(54) AUTO PAUSE WHEN DISTURBED

(71) Applicant: Sony Mobile Communications Inc., Tokyo (JP)

(72) Inventor: Tomas Wässingbo, Lund (SE)

(73) Assignee: Sony Group Corporation, Tokyo (JP)

(*) Notice: Subject to any disclaimer, the term of this patent is extended or adjusted under 35 U.S.C. 154(b) by 879 days.

(21) Appl. No.: 14/882,490

(22) Filed: Oct. 14, 2015

(65) Prior Publication Data

US 2017/0111677 A1 Apr. 20, 2017

(51) Int. Cl.
| | | |
|---|---|---|
| *H04N 21/422* | (2011.01) | |
| *H04N 21/433* | (2011.01) | |
| *H04M 1/72454* | (2021.01) | |
| *H04N 21/2387* | (2011.01) | |
| *H04N 21/44* | (2011.01) | |
| *H04M 1/72442* | (2021.01) | |

(52) U.S. Cl.
CPC .. *H04N 21/42203* (2013.01); *H04M 1/72454* (2021.01); *H04N 21/2387* (2013.01); *H04N 21/4333* (2013.01); *H04N 21/44004* (2013.01); *H04M 1/72442* (2021.01)

(58) Field of Classification Search
CPC ......... H04N 21/42203; H04N 21/4333; H04N 21/2387; H04N 21/44004; H04M 1/72454; H04M 1/72442
See application file for complete search history.

(56) References Cited

U.S. PATENT DOCUMENTS

| | | | | |
|---|---|---|---|---|
| 2011/0292299 A1* | 12/2011 | Lau | ....................... | G06F 3/0346 348/734 |
| 2016/0029016 A1* | 1/2016 | Yoo | ................... | H04N 21/42203 348/180 |

* cited by examiner

*Primary Examiner* — Nathan J Flynn
*Assistant Examiner* — Christine A Kurien
(74) *Attorney, Agent, or Firm* — Renner, Otto, Boisselle & Sklar, LLP

(57) ABSTRACT

A device and method of automatically pausing media content executing on the electronic device are provided. Sound within an ambient environment in which the electronic device resides is monitored, and the sound in the ambient environment is compared to a prescribed sound threshold. Upon the sound in the ambient environment exceeding the prescribed sound threshold, execution of media content on the electronic device is automatically paused.

5 Claims, 2 Drawing Sheets

AUTO PAUSE WHEN DISTURBED

TECHNICAL FIELD OF THE INVENTION

The present disclosure relates generally to electronic equipment and, more particularly, to an apparatus and method for pausing media content on electronic equipment upon detection of an audible disturbance in the ambient environment.

DESCRIPTION OF THE RELATED ART

Media content, such as audio (e.g., music, podcasts and/or spoken words) and video (e.g., video clips, movies, etc.) are often played on electronic devices, such as mobile phones and the like. Such media content may reside on the electronic device itself, e.g., stored in memory of the electronic device, or it may be provided to the electronic device from a remote source, e.g., a server that streams video, pod casts, etc. to the electronic device.

When playing media content on an electronic device, disturbances in the ambient environment, e.g., children playing nearby, the sound of a ceiling fan, a dog barking, electronic appliances, etc., can make it difficult to hear the audio portion of the media content. As a result, the user may need to "rewind" the content back to a point prior to the disturbance and replay the media content. As will be appreciated, this can be a tedious task as it can be time consuming to find the portion of the media content that was playing just prior to the disturbance.

SUMMARY

An apparatus and method in accordance with the present disclosure can overcome one or more drawbacks associated with conventional means for playing media content on an electronic device. More particularly, an electronic device and method in accordance with the present disclosure can obtain and analyze background sound within the ambient environment. Upon the background sound exceeding a prescribed sound level, playback of the media content on the electronic device is automatically paused. Such playback may be paused until the detected background sound is below the prescribed sound level. Playback may be paused until the detected background sound is below the prescribed sound level for a prescribed period of time (e.g., one or more seconds). Alternatively, playback may be paused until a user manually requests that playback be resumed (e.g., by pressing a key).

According to one aspect of the disclosure, an electronic device includes: a processor; a memory operatively coupled to the processor; and a media player module for executing media content on the electronic device, the media player module stored in the memory and executable by the processor, wherein when executed by the processor the media player module causes the electronic device to i) monitor sound within an ambient environment in which the electronic device resides; ii) compare the monitored sound in the ambient environment to a prescribed sound threshold; and iii) pause execution of the media content upon the sound in the ambient environment exceeding the prescribed sound threshold.

According to another aspect of the disclosure, a method of controlling flow of media content on an electronic device includes: executing media content on the electronic device; monitoring sound within an ambient environment in which the electronic device resides; comparing the sound in the ambient environment to a prescribed sound threshold; and upon the sound in the ambient environment exceeding the prescribed sound threshold, automatically pausing execution of media content on the electronic device.

According to another aspect of the disclosure, a non-transitory computer readable medium comprising computer executable instructions adapted to control a flow of media content on an electronic device includes: logic configured to execute media content on the electronic device; logic configured to monitor sound within an ambient environment in which the electronic device resides; logic configured to compare the sound in the ambient environment to a prescribed sound threshold; and logic configured to automatically pause execution of media content on the electronic device upon the sound in the ambient environment exceeding the prescribed sound threshold.

To the accomplishment of the foregoing and the related ends, the device and method comprises the features hereinafter fully described in the specification and particularly pointed out in the claims, the following description and the annexed drawings setting forth in detail certain illustrative embodiments, these being indicative, however, of but several of the various ways in which the principles of the invention may be suitably employed.

Although the various features are described and are illustrated in respective drawings/embodiments, it will be appreciated that features of a given drawing or embodiment may be used in one or more other drawings or embodiments of the invention.

DETAILED DESCRIPTION OF EMBODIMENTS

Figure 1:
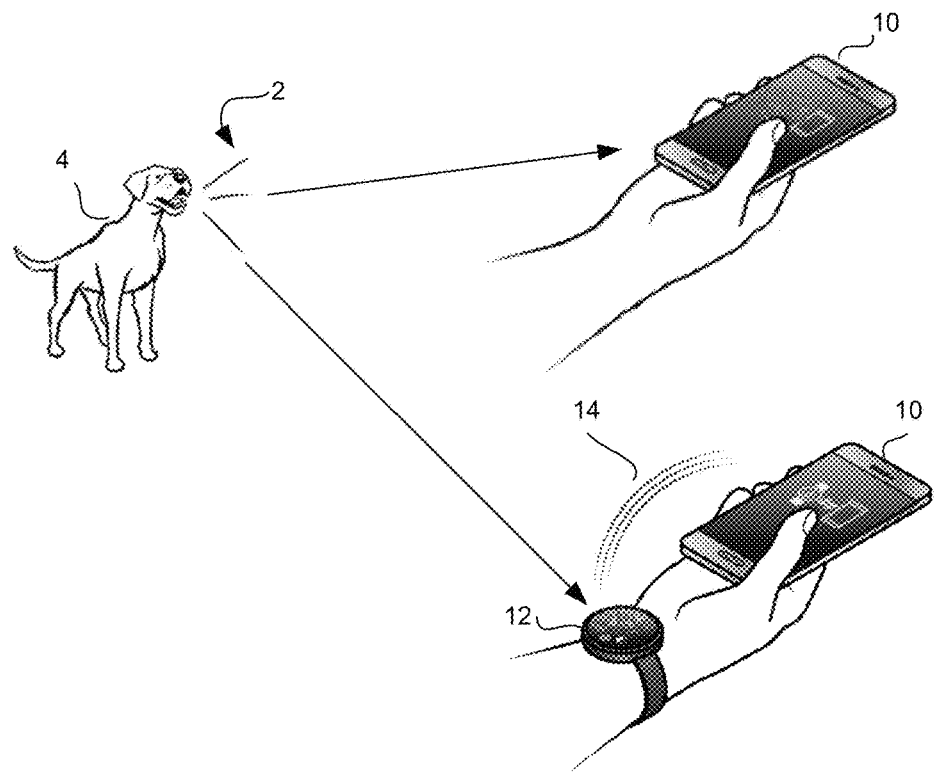
FIG. 1 is a schematic diagram illustrating mobile devices in an environment having background noise.

Embodiments will now be described with reference to the drawings, wherein like reference numerals are used to refer to like elements throughout. It will be understood that the figures are not necessarily to scale. Also, features that are described and/or illustrated with respect to one embodiment may be used in the same way or in a similar way in one or more other embodiments and/or in combination with or instead of the features of the other embodiments.

The terms "electronic equipment" and "electronic device" may be used interchangeably and include portable radio communication equipment. The term "portable radio communication equipment," which herein after is referred to as a "mobile radio terminal," "mobile phone," "mobile device," or "mobile terminal", and the like, includes all equipment such as mobile telephones, pagers, communicators, i.e., electronic organizers, personal digital assistants (PDAs), smartphones, portable communication apparatus or the like. The terms "electronic equipment" and "electronic device" also may include digital music and/or video devices, e.g., iPod devices, mp3 players, portable game systems, televisions, portable television devices for use with televisions/display devices, home theater PC (HTPC) systems, etc.

Conventional electronic equipment, such as mobile phones, for example, have the ability to play or otherwise execute various types of media content. As used herein, media content includes audio content (e.g., music, podcasts and/or speech utilizing various formats including mp3, wmv, etc.), video content (e.g., movies using no compression or various compression techniques such as mpeg, divx, etc.) and executable code (e.g., computer programs having audio output portions). Further, media content is not restricted to any particular file format, and can include any file format.

Additionally, the term "execute" (or forms thereof including executing and executable), in addition to carrying out or performing instructions (e.g., executing a computer program or the like), is to be construed to include playing media content (e.g., playing an audio file, to play an audio file, playable file), viewing media content (e.g., viewing a video file, to view a video file, viewable video file), streaming media content, or otherwise rendering media content for output on the electronic device. The terms execute, play, view (or forms thereof) may be used interchangeably herein.

The present disclosure describes a device and method for controlling flow of media content being executed on an electronic device. With reference to FIG. 1, the sound present in the ambient environment (e.g., a barking sound 2 created by a dog 4) in which the electronic device 10 resides is monitored. In one embodiment such monitoring includes, for example, obtaining sound in the ambient environment from a microphone of the electronic device 10. Such obtained sound may be converted to digital form for further analysis in the electronic device. In another embodiment such monitoring includes using another electronic device 12 to collect the sound, the another electronic device 12 being separate and distinct from the electronic device 10. The another electronic device 12 then can communicate the collected sound (which may be converted to digital form by the another electronic device) to the electronic device 10 via a communication link 14 (e.g., a wired or wireless connection). The another electronic device 12 may be, for example, a smart watch, a bracelet, a necklace, a tablet computer, a smart phone, or any other electronic device that may be present in the same environment as the electronic device 10.

The data corresponding to the sound in the ambient environment then is compared to a prescribed sound threshold to determine if a pause operation should be implemented. For example, if the sound in the ambient environment exceeds the prescribed threshold, then a flag may be set that indicates an automatic pause command should be issued. However, if the sound in the ambient environment does not exceed the prescribed threshold, then the flag may be reset thus indicating execution of the media content should continue as normal.

In performing the comparison, the electronic device 10 may compare the frequencies of the sound in the ambient environment to the frequencies of the sound produced by the media content. If the respective frequencies correspond to one another, this may indicate that the sound detected in the ambient environment is actually being produced by the electronic device 10 and/or that the sound is not interfering noise. In such situation, the media content need not be paused. However, if the frequencies do not correspond to one another, then a pause a flag may be set indicating a pause operation should be executed, or a flag may be set indicating further analysis should be performed before setting the pause flag, e.g., determining if the sound exceeds the prescribed threshold.

In one embodiment the prescribed threshold is a user settable threshold that may be set, for example, in a configuration menu of the electronic device 10. In another embodiment, the prescribed threshold can vary based on settings of the electronic device 10. For example, the prescribed threshold may be set based on a volume setting of the electronic device 10. In this regard, as the volume of the electronic device 10 is increased or decreased, the prescribed threshold is also increased or decreased. A correspondence between the volume setting and the prescribed threshold may have a linear relationship or a non-linear relationship.

If a pause flag has been set, then execution of the media content is paused. It is noted that the executed media content may be stored on the electronic device, or may be stored on a device remote from the electronic device. Such remotely stored media content may be transferred in its entirety from the remote device to the electronic device, or it may be streamed from the remote device to the electronic device.

While in the paused state, media content that is being streamed to the electronic device 10 may be buffered in memory of the electronic device 10. This can be advantageous, for example, if the connection between the electronic device and the streaming source is weak as it can minimize interruptions during the normal play of the media content.

Execution of the media content can resume upon the satisfaction of certain criteria. In one embodiment, execution of the media content is resumed upon detecting a user-initiated command to resume execution. For example, the user may provide an input, such as pressing a button or touching a specific area of a touch screen of the electronic device 10, the input indicative of a request to resume execution of the media content. Upon detection of such request, execution of the media content is resumed. In another embodiment, execution of the media content is automatically resumed upon the sound in the ambient environment falling below the prescribed sound threshold for a prescribed user-settable time period.

Figure 2:
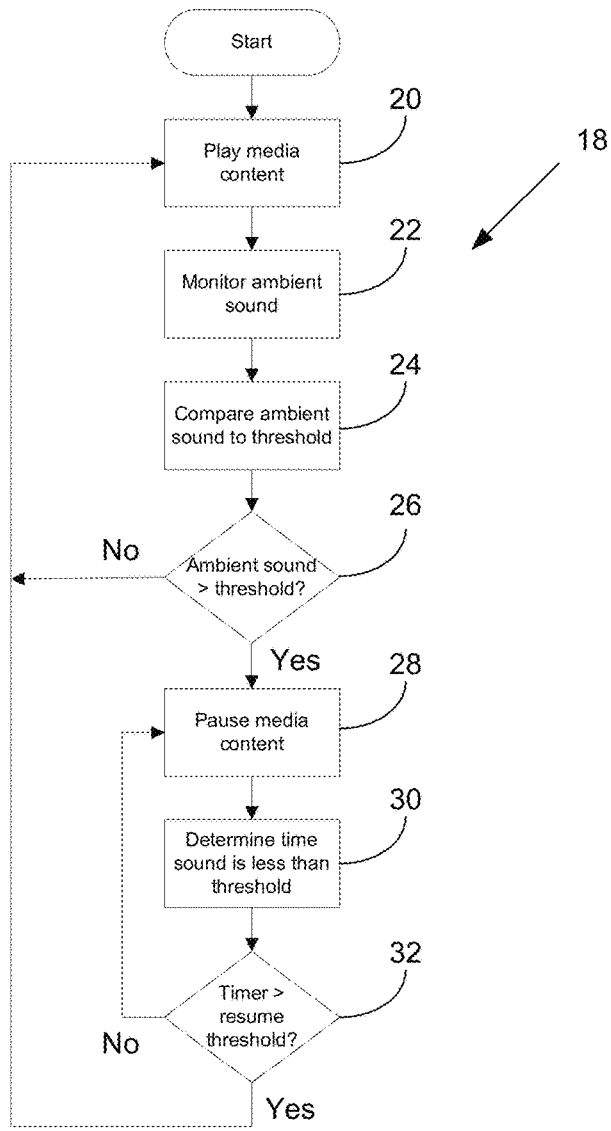
FIG. 2 is a flow chart illustrating exemplary steps for performing an auto pause function in accordance with the present disclosure.

Referring now to FIG. 2, illustrated is a flow diagram that depicts an exemplary method of implementing a media player function for controlling execution of media content in an electronic device. Although the method descriptions and flow chart may show specific orders of executing steps, the order of executing the steps may be changed relative to the order described. Also, two or more steps described in succession may be executed concurrently or with partial concurrence. One or more of the described or illustrated steps may be omitted.

The exemplary method of FIG. 2 may be implemented using coded instructions (e.g., computer readable instructions) stored on one or more non-transitory computer readable media such as flash memory, read-only memory (ROM), random-access memory (RAM), cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Typical non-transitory computer readable media include electronic memory devices, magnetic memory devices and optical memory devices. The method may be executed by an electronic device, such as electronic device 10. In one embodiment, to carry out the method, the logical instructions embodying the method are executed by a processor of the electronic device. Alternatively, the method may be at least partially implemented in hardware of the electronic device (e.g., an application-specific integrated circuit (ASIC) or the like.

The method may begin at step 20, where media content is executed on the electronic device 10 (e.g., a podcast is played). Next at step 22 the ambient sound is monitored, for example, using a microphone or other like device of the electronic device 10. Alternatively, the ambient sound may be monitored by another electronic device 12 and transferred to the electronic device 10. The monitored sound, which may be converted to digital form, is compared to a prescribed sound threshold as indicated at steps 24 and 26. If at step 26 the ambient sound does not exceed the threshold, then the method moves back to step 20 and execution of the media content continues. However, if the ambient sound does exceed the threshold then the method moves to step 28 and execution of the media content is paused.

At step 30, a timer monitors the length of time in which the ambient sound does not exceed the threshold. For example, the timer may begin timing when the ambient sound is below the threshold, and reset each time the ambient sound exceeds the threshold. In this example, the ambient sound must remain below the threshold for a prescribed time period, otherwise the timer rests. At step 32 it is determined if the timer exceeds a "resume" time threshold, i.e., has the ambient sound been continuously below the threshold for the resume time period. If the timer does not exceed the resume threshold, the method moves back to step 28 and the media content remains paused. However, if the timer has exceeded the resume threshold, the method moves back to step 20 where execution of the media content is resumed.

Although not shown in FIG. 2, it will be appreciated that the steps for automatic resume (i.e., steps 30 and 32) may be replaced with a manual resume based on a user input command. For example, instead of monitoring time, the method may monitor a user input corresponding to a resume request. If a resume request is detected the method may move back to step 20 and the media content is resumed, and if a resume request is not detected the method moves to step 28 and the media content remains paused.

Figure 3:
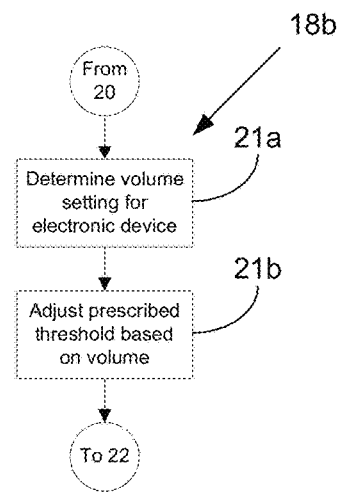
FIG. 3 is a flow chart illustrating exemplary steps for setting a sound threshold level in accordance with the present disclosure.

Referring now to FIG. 3, illustrated are optional steps that may be included in the flow chart of FIG. 2. The steps illustrated in FIG. 3 may be inserted, for example, between steps 20 and 22 and are directed to automatically adjusting the prescribed sound threshold level. Beginning at step 21a, the volume of the electronic device is determined. Such determination may be made, for example, by reading an internal volume setting for the electronic device (e.g., a digital volume setting or "gain"). Next at step 21b, the volume setting is used to adjust the prescribed threshold. For example, the prescribed threshold may be multiplied by the ratio of the actual volume setting divided by the maximum volume setting. In this manner, the volume setting may be considered a "gain" factor that can be used to scale the prescribed threshold up or down.

Preferably, the prescribed threshold is prevented from dropping below an absolute minimum value. Such absolute limit can prevent triggering a pause command upon the detection of any sound, regardless of the intensity. Upon adjusting the prescribed threshold, the method moves to step 22 and continues as described above.

Figure 4:
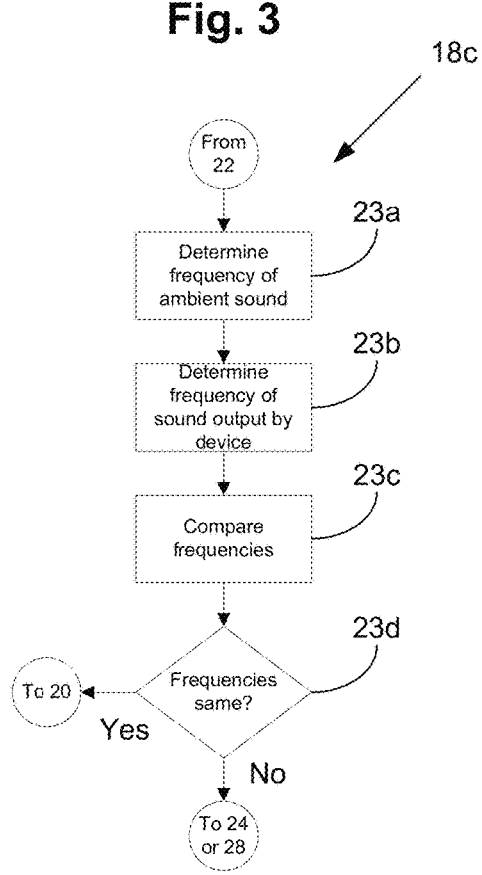
FIG. 4 is a flow chart illustrating exemplary steps for determining if the detected background sound corresponds to the sound output by the electronic device.

Referring now to FIG. 4, illustrated are further optional steps that may be included in the flow chart of FIG. 2. The steps illustrated in FIG. 4 may be inserted, for example, between steps 22 and 24 and are directed to determining if the detected ambient sound is generated by the electronic device and/or whether or not sound is "interfering" or "non-interfering" sound.

Beginning at step 23a, a frequency spectrum of the ambient sound is determined, for example, by processing the ambient sound signal using conventional techniques. Next at step 23b a frequency spectrum of the sound output by the electronic device 10 is also determined in a similar manner, and at step 23c to two frequency spectrums are compared, for example, using magnitude-squared coherence or other means for comparing frequency spectrums. If at step 23d the respective spectrums are determined to be substantially the same, then no further analysis is necessary and the method may move back to step 20 where execution of the media content continues. However, if the respective frequency spectrums are substantially different, then this indicates that the sound may be interfering sound. In this regard the method may move to step 28 and pause the media content, or it may move to step 24 to check a sound level of the noise relative to the prescribed threshold as described above. As used herein, frequency spectrums are considered substantially the same when the comparison result indicates the spectrums are within 10% of one another, and are substantially different when the comparison result indicates the spectrums are not within 10% of one another. Thus, when using magnitude-squared coherence analysis frequency spectrums are considered substantially the same when the analysis returns a value of 0.9 or more and substantially different when the analysis returns a value of less than 0.9.

Figure 5:
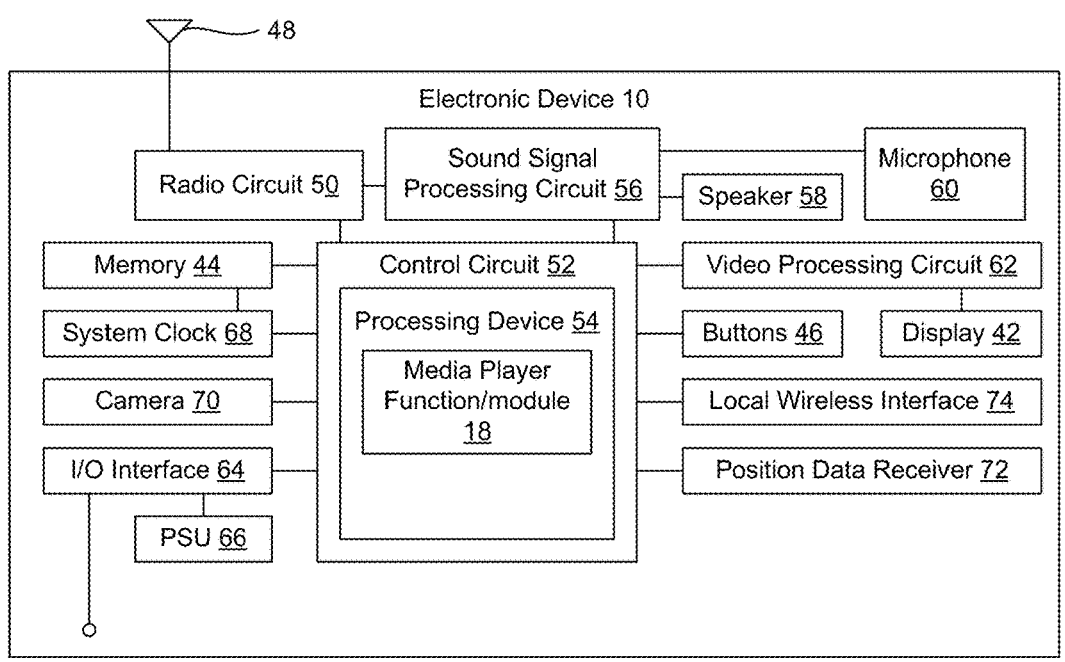
FIG. 5 is a schematic block diagram of a number of exemplary relevant portions of a mobile phone in accordance with the present disclosure.

The above-described media player function 18, 18a, 18b may be performed by an electronic device 10, an example of which is illustrated in FIG. 5. The electronic device 10 may be any type of electronic device, examples of which include a mobile device, a tablet computer, a television, a head set, a media player, a gaming device, a communicator, a portable communication apparatus, etc. The electronic device 10 includes the media player function 18, 18a, 18b (also referred to as a media player module) that is configured to execute media content as described with respect to FIGS. 2-4.

The electronic device 10 may include a display 42. The display 42 displays information to a user such as operating state, time, telephone numbers, contact information, various menus, etc., that enable the user to utilize the various features of the electronic device 10. The display 42 also may be used to visually display content received by the electronic device 10 and/or retrieved from a memory 44 of the electronic device 10. The display 42 may be used to present images, video and other graphics to the user, such as photographs, mobile television content, Internet pages, and video associated with games.

Buttons 46 provide for a variety of user input operations. For example, the buttons 46 may include buttons for allowing entry of information, special function buttons (e.g., one or more of a call send and answer button, multimedia playback control buttons, a camera shutter button, etc.), navigation and select buttons or a pointing device, and so forth. Buttons or button-like functionality also may be embodied as a touch screen associated with the display 42. Also, the display 42 and buttons 46 may be used in conjunction with one another to implement soft key functionality.

The exemplary electronic device 10 includes communications circuitry that enables the electronic device 10 to establish communications with another device. Communications may include calls, data transfers, and the like. Calls may take any suitable form such as, but not limited to, voice calls and video calls. The calls may be carried out over a cellular circuit-switched network or may be in the form of a voice over Internet Protocol (VoIP) call that is established over a packet-switched capability of a cellular network or over an alternative packet-switched network (e.g., a network compatible with IEEE 802.11, which is commonly referred to as WiFi, or a network compatible with IEEE 802.16, which is commonly referred to as WiMAX), for example. Data transfers may include, but are not limited to, receiving streaming content (e.g., streaming audio, streaming video, etc.), receiving data feeds (e.g., pushed data, podcasts, really simple syndication (RSS) data feeds data feeds), downloading and/or uploading data (e.g., image files, video files, audio files, ring tones, Internet content, etc.), receiving or sending messages (e.g., text messages, instant messages, electronic mail messages, multimedia messages), and so forth. This data may be processed by the electronic device 10, including storing the data in the memory 44, executing applications to allow user interaction with the data, displaying video and/or image content associated with the data, outputting audio sounds associated with the data, and so forth.

In the exemplary embodiment, the communications circuitry may include an antenna 48 coupled to a radio circuit 50. The radio circuit 50 includes a radio frequency transmitter and receiver for transmitting and receiving signals via the antenna 48.

The radio circuit 50 may be configured to operate in a mobile communications system. Radio circuit 50 types for interaction with a mobile radio network and/or broadcasting network include, but are not limited to, global system for mobile communications (GSM), code division multiple access (CDMA), wideband CDMA (WCDMA), general packet radio service (GPRS), WiFi, WiMAX, digital video broadcasting-handheld (DVB-H), integrated services digital broadcasting (ISDB), high speed packet access (HSPA), etc., as well as advanced versions of these standards or any other appropriate standard. It will be appreciated that the electronic device 10 may be capable of communicating using more than one standard. Therefore, the antenna 48 and the radio circuit 50 may represent one or more than one radio transceiver.

The electronic device 10 may include a primary control circuit 52 that is configured to carry out overall control of the functions and operations of the electronic device 10. The control circuit 52 may include a processing device 54, such as a central processing unit (CPU), microcontroller or microprocessor. The processing device 54 executes code stored in a memory (not shown) within the control circuit 44 and/or in a separate memory, such as the memory 44, in order to carry out operation of the electronic device 10. For instance, the processing device 54 may execute code that implements the media player function 18. The memory 44 may be, for example, one or more of a buffer, a flash memory, a hard drive, a removable media, a volatile memory, a non-volatile memory, a random access memory (RAM), or other suitable device. In a typical arrangement, the memory 44 may include a non-volatile memory for long term data storage and a volatile memory that functions as system memory for the control circuit 52. The memory 44 may exchange data with the control circuit 52 over a data bus. Accompanying control lines and an address bus between the memory 44 and the control circuit 52 also may be present.

The electronic device 10 may further include a sound signal processing circuit 56 for processing audio signals transmitted by and received from the radio circuit 50. Coupled to the sound processing circuit 56 are a speaker 58 and a microphone 60 that enable a user to listen and speak via the electronic device 10, as well as monitor the ambient sound. The radio circuit 50 and sound processing circuit 54 are each coupled to the control circuit 52 so as to carry out overall operation. Audio data may be passed from the control circuit 52 to the sound signal processing circuit 56 for playback to the user. The audio data may include, for example, audio data from an audio file stored by the memory 44 and retrieved by the control circuit 52, or received audio data such as in the form of voice communications or streaming audio data from a mobile radio service, podcast, etc. The sound processing circuit 54 may include any appropriate buffers, decoders, amplifiers and so forth.

The display 42 may be coupled to the control circuit 52 by a video processing circuit 62 that converts video data to a video signal used to drive the display 42. The video processing circuit 62 may include any appropriate buffers, decoders, video data processors and so forth. The video data may be generated by the control circuit 52, retrieved from a video file that is stored in the memory 44, derived from an incoming video data stream that is received by the radio circuit 40 or obtained by any other suitable method.

The electronic device 10 may further include one or more input/output (I/O) interface(s) 64. The I/O interface(s) 64 may be in the form of typical I/O interfaces and may include one or more electrical connectors. The I/O interface(s) 64 may form one or more data ports for connecting the electronic device 10 to another device (e.g., a computer) or an accessory (e.g., a personal hands free (PHF) device) via a cable. Further, operating power may be received over the I/O interface(s) 64 and power to charge a battery of a power supply unit (PSU) 66 within the electronic device 10 may be received over the I/O interface(s) 64. The PSU 66 may supply power to operate the electronic device 10 in the absence of an external power source.

The electronic device 10 also may include various other components. For instance, a system clock 68 may clock components such as the control circuit 52 and the memory 44. A camera 70 may be present for taking digital pictures and/or movies. Image and/or video files corresponding to the pictures and/or movies may be stored in the memory 44. A position data receiver 72, such as a global positioning system (GPS) receiver, Galileo satellite system receiver or the like, may be involved in determining the position of the electronic device 10. A local wireless interface 74, such as an infrared transceiver and/or an RF transceiver (e.g., a Bluetooth chipset) may be used to establish communication with a nearby device, such as an accessory (e.g., a PHF device), another mobile radio terminal, a computer or another device.

Although certain embodiments have been shown and described, it is understood that equivalents and modifications falling within the scope of the appended claims will occur to others who are skilled in the art upon the reading and understanding of this specification.

What is claimed is:
1. An electronic device comprising:
an electronic processor;
a memory operatively coupled to the processor; and
 a media player module for executing media content on the electronic device, the media player module stored in the memory and executable by the processor, wherein when executed by the processor the media player module causes the electronic device to
 i) monitor sound within an ambient environment in which the electronic device resides;

ii) compare the monitored sound in the ambient environment to a prescribed sound threshold and compare a frequency of the sound in the ambient environment with a frequency of sound output by the electronic device; and iii) pause execution of the media content upon the sound in the ambient environment exceeding the prescribed sound threshold when the frequency of the ambient sound is substantially different from the frequency of the sound output by the electronic device.

2. An electronic device comprising:

an electronic processor;

a memory operatively coupled to the processor; and a media player module for executing media content on the electronic device, the media player module stored in the memory and executable by the processor, wherein when executed by the processor the media player module causes the electronic device to i) monitor sound within an ambient environment in which the electronic device resides;

ii) compare the monitored sound in the ambient environment to a prescribed sound threshold;

iii) pause execution of the media content upon the sound in the ambient environment exceeding the prescribed sound threshold; and iv) resume execution of the media content upon the sound in the ambient environment falling below the prescribed sound threshold for a prescribed time period.

3. A method of controlling flow of media content on an electronic device, comprising:

executing media content on the electronic device;

monitoring sound with an ambient environment in which the electronic device resides, wherein monitoring comprises using another electronic device to collect sound data, the another electronic device separate from the electronic device;

comparing the sound in the ambient environment to a prescribed sound threshold; and upon the sound in the ambient environment exceeding the prescribed sound threshold, automatically pausing execution of media content on the electronic device.

4. A method of controlling flow of media content on an electronic device, comprising:

executing media content on the electronic device;

monitoring sound with an ambient environment in which the electronic device resides;

comparing the sound in the ambient environment to a prescribed sound threshold and comparing a frequency of the sound in the ambient environment with a frequency of sound output by the electronic device; and upon the sound in the ambient environment exceeding the prescribed sound threshold and when the frequency of the ambient sound is substantially different from the frequency of the sound output by the electronic device, automatically pausing execution of media content on the electronic device.

5. A method of controlling flow of media content on an electronic device, comprising:

executing media content on the electronic device;

monitoring sound with an ambient environment in which the electronic device resides;

comparing the sound in the ambient environment to a prescribed sound threshold;

upon the sound in the ambient environment exceeding the prescribed sound threshold, automatically pausing execution of media content on the electronic device; and resuming execution of the media content upon the sound in the ambient environment falling below the prescribed sound threshold for a prescribed time period.

* * * * *